United States Patent
Shioji

(10) Patent No.: US 8,446,491 B2
(45) Date of Patent: May 21, 2013

(54) IMAGE CAPTURE DEVICE, METHOD OF CONTROLLING THE SAME, AND IMAGE CAPTURE SYSTEM

(75) Inventor: Masahiro Shioji, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 603 days.

(21) Appl. No.: 12/476,709

(22) Filed: Jun. 2, 2009

(65) Prior Publication Data

US 2009/0295946 A1 Dec. 3, 2009

(30) Foreign Application Priority Data

Jun. 2, 2008 (JP) ................................. 2008-144884

(51) Int. Cl.
*H04N 5/232* (2006.01)
*H04N 5/76* (2006.01)

(52) U.S. Cl.
USPC ................. 348/231.5; 348/211.2; 348/211.3; 348/231.2

(58) Field of Classification Search
USPC .................. 348/211.1–211.3, 231.99, 231.2, 348/231.5, 231.7–231.9
See application file for complete search history.

(56) References Cited

U.S. PATENT DOCUMENTS

| | | | |
|---|---|---|---|
| 6,701,058 B1 * | 3/2004 | Tsubaki | 386/226 |
| 7,576,773 B2 | 8/2009 | Fukushima et al. | |
| 2002/0154221 A1 * | 10/2002 | Ishimaru | 348/207.1 |
| 2002/0158970 A1 * | 10/2002 | Takeshi | 348/211.3 |
| 2004/0064834 A1 * | 4/2004 | Kuwata et al. | 725/86 |
| 2006/0085474 A1 | 4/2006 | Tsubono | |
| 2008/0154982 A1 * | 6/2008 | Watanabe | 707/203 |

FOREIGN PATENT DOCUMENTS

| | | |
|---|---|---|
| JP | 05091452 | 4/1993 |
| JP | 2001-238112 A | 8/2001 |
| JP | 2002-252798 A | 9/2002 |
| JP | 2002359763 | 12/2002 |
| JP | 2004-328544 A | 11/2004 |
| JP | 2005-018268 A | 1/2005 |
| JP | 2006-053871 A | 2/2006 |
| JP | 2006-287909 A | 10/2006 |
| WO | 2004/090729 A1 | 10/2004 |

OTHER PUBLICATIONS

Machine translation of JP2005-018268 to Horie published Jan. 20, 2005.*
Japanese Office Action dated May 8, 2012.
English Abstract for JP 2005-018268 A, published Jan. 20, 2005.
English Abstract for JP 2004-328544 A, published Nov. 18, 2005.
English Abstract for JP 2002-252798 A, published Sep. 6, 2002.
English Abstract for JP 2006-053871 A, published Feb. 23, 2006.
Chinese Office Action dated Jun. 5, 2012.

(Continued)

*Primary Examiner* — Daniel M Pasiewicz
(74) *Attorney, Agent, or Firm* — NDQ&M Watchstone LLP

(57) ABSTRACT

An image capture device of the present invention has an image shooting function, and is connectable to an external storage device. The image capture device includes: a memory in which image data obtained by image shooting is stored; a transmission unit for transmitting several pieces of image data stored in the memory at a time to the external storage device; and an allocation unit for allocating the several pieces of image data transmitted to the external storage device to one or a plurality of directories according to a certain index.

17 Claims, 12 Drawing Sheets

OTHER PUBLICATIONS

English Abstract for JP 2001-238112A, published Aug. 31, 2001.
Office action issued Feb. 5, 2013 in a corresponding Japanese patent application JP 2008-144884.
English Abstract and machine translation for JP 2006-287909 A, published Oct. 19, 2006.
DMX-HD1000 Instruction Manual Xacti Library Function Part, [online], Sanyo Electric Co., Ltd., Sep. 2007, p.i-16,33,34, Internet <URL:http://ctlg.panasonic.co.jp/sanyo/products/support/manuallpdf/DMXD 1 000-1 .pdf>.
Sanyo, Full HD/MPEG-4 new "Xacti" which can AVC record, [online], Kabushiki-kaisya Impress Watch, Aug. 30, 2007, Internet <URL:http://av.watch.impress.co.jp/docs/20070830/sanyo.htm>.

* cited by examiner

IMAGE CAPTURE DEVICE, METHOD OF CONTROLLING THE SAME, AND IMAGE CAPTURE SYSTEM

The Japanese application Number 2008-144884, upon which this patent application is based, is hereby incorporated by reference.

BACKGROUND OF THE INVENTION

1. Field of the Invention

The present invention relates to an image capture device such as a digital camera and a method of controlling the same which specifically can transmit image data obtained by shooting.

2. Description of Related Art

A conventionally used image capture device such as a digital camera can shoot still images and moving images, and can record sounds during shooting. Image data and audio data obtained by shooting can be written as image files and audio files into a memory.

As an example, in a digital camera shown in FIG. 13, a camera body 41 includes an optical system 42 with a lens, a CCD and the like, a camera signal processing circuit 43, an encoder 44, a memory card 47, a decoder 45, a video output circuit 46, and an interface 48.

The camera signal processing circuit 43 performs necessary processing upon a signal obtained from the optical system 42. The encoder 44 encodes a video signal obtained from the camera signal processing circuit 43 by a compression technique such as JPEG. The memory card 47 is an attachable/detachable memory, and into which a video signal obtained from the encoder 44 is written. The decoder 45 decodes a video signal read from the memory card 47 by a compression technique such as JPEG. The video output circuit 46 outputs a video signal obtained from the decoder 45 to a display 49. The interface 48 is connected to a storage device 51.

The digital camera described above can write an image file and an audio file obtained by shooting into the memory card 47, and also can read an image file from the memory card 47 and display the same on the display 49.

As shown in FIG. 13, the storage device 51 connected to the digital camera includes a card drive 52, an interface 53, a storage medium 54, a decoder 55, and a video output circuit 56. The card drive 52 reads a signal from the memory card 47. The interface 53 is connected to the interface 48 of the digital camera. The storage medium 54 is a hard disk and the like, and into which a signal obtained from the card drive 52 or the interface 53 is stored. The decoder 55 decodes a video signal read from the storage medium 54 by a compression technique such as JPEG. The video output circuit 56 outputs a video signal obtained from the decoder 55 to a display 57.

So, by connecting the storage device 51 to the digital camera, an image file and an audio file stored in the memory card 47 of the digital camera can be transmitted to the storage device 51, and stored in the storage device 51. The storage device 51 can read an image file from the storage medium 54, and display the image file on the display 57 connected to the storage device 51.

In many cases, a personal computer has conventionally been used as the storage device 51. An image file and an audio file are transmitted from the digital camera to the storage device 51 under control of the storage device 51. Namely, the conventionally used storage device 51 regards the memory card 47 of the digital camera as an external memory of the storage device 51, and writes a file read from the memory card 47 through the interfaces 48 and 53 into the storage medium 54 such as a hard disk.

A storage device such as a personal computer has high processing power. So, the storage device can allocate image files to directories by date of shooting in parallel with transmission of the image files. Allocation of image data to directories by date of shooting makes it possible to manage image files stored in the storage device 51 according to date of shooting.

However, execution of transmission in the storage device 51 results in an inconvenience, since, like a personal computer, the storage device 51 should be equipped with a transmission unit.

In response, the inventor of the present invention has suggested that an image capture device be responsible for the transmission. According to this technique, image data can be transmitted from an image capture device to an external storage device connected to the image capture device even when the external storage device has no transmission unit.

However, an image capture device such as a digital camera is lower in processing power than a storage device such as a personal computer. Accordingly, transmission of image data (image files) takes a long time if an image capture device performs allocation of the image data (image files) to directories by date of shooting in parallel with the transmission of the image data (image files). If an image capture device is expected to be the same in processing power as a storage device, the image capture device should be increased in size. This undesirably goes against market needs for downsizing of image capture devices.

SUMMARY OF THE INVENTION

In a downsized image capture device, the present invention is intended to reduce the time of transmission of image data, and to realize management of image data by the image capture device.

According to a first aspect of an image capture device of the present invention, the image capture has an image shooting function, and is connectable to an external storage device. The image capture device includes: a memory in which image data obtained by image shooting is stored; a transmission unit for transmitting several pieces of image data stored in the memory at a time to the external storage device; and an allocation unit for allocating the several pieces of image data transmitted to the external storage device to one or a plurality of directories according to a certain index.

In the image capture device of the first aspect, several pieces of image data stored in the memory are transmitted at a time to the external storage device. This reduces transmission time, compared to the case where other processing is performed in parallel with transmission. After the transmission, the transmitted several pieces of image data are allocated to one or a plurality of directories according to a certain index. So, image data stored in the external storage device can be managed according to the certain index.

According to a second aspect of the image capture device of the present invention, in the image capture device of the first aspect, the certain index is a date of image shooting.

In the image capture device of the second aspect, image data is allocated according to date of image shooting. So, image data can be managed according to date of shooting.

According to a third aspect of the image capture device of the present invention, in the image capture device of the first or second aspect, the transmission unit incorporates a directory structure formed in the memory as it is into a directory structure formed in the external storage device.

In the image capture device of the third aspect, as a result of transmission of image data from the memory to the external storage device, a directory structure formed in the memory is maintained as it is in the external storage device. Thus, transmission time is reduced.

According to a fourth aspect of the image capture device of the present invention, in the image capture device of the third aspect, the directory structure formed in the memory is incorporated into the lowermost level of the directory structure formed in the external storage device.

A directory structure is changed easier in a lower level of the directory structure. In the image capture device of the fourth aspect, a directory structure formed in the memory is incorporated into the lowermost level of a directory structure formed in the external storage device. This makes the change of a directory structure easy necessitated by allocation of transmitted image data.

According to a fifth aspect of the image capture device of the present invention, in the image capture device of any one of the second to fourth aspects, the directory structure formed in the external storage device contains a data management directory for storing therein image data, and for managing the date of shooting of the image data. When the date of shooting of the image data is the same as that managed by the date management directory, the allocation unit causes the image data to remain in the data management directory.

In the image capture device of the fifth aspect, in allocation of image data according to date of image shooting, the image data with a date of shooting same as that managed by the date management directory is not required to be moved to a different date management directory. This simplifies allocation of image date by the allocation unit.

According to a sixth aspect of the image capture device of the present invention, in the image capture device of any one of the second to fourth aspects, the directory structure formed in the external storage device contains a data management directory for storing therein image data, and for managing the date of shooting of the image data. When the date of shooting of the image data is different from that managed by the date management directory, the allocation unit moves the image data to a different date management directory for managing the different date of shooting.

In the image capture device of the sixth aspect, the image data with the different date of shooting is moved to the date management directory for managing the different date of shooting. So, image data can be managed according to date of shooting.

According to a seventh aspect of the image capture device of the present invention, the image capture device of the sixth aspect further includes a directory creation unit for creating the different date management directory. Before the image data is moved to the different date management directory for managing the different date of shooting, the allocation unit determines whether or not the different date management directory is present in the directory structure formed in the external storage device, and the directory creation unit creates the different date management directory when the allocation unit determines that the different date management directory is not present.

In the image capture device of the seventh aspect, the directory creation unit creates a date management directory corresponding to the date of shooting of image data if such a date management directory is not present. So, allocation of image data according to date of shooting is efficiently realized.

An image capture system of the present invention includes the image capture device of any one of the first to seventh aspects, and an external storage device connected to the image capture device. The image capture device functions as a master, and the external storage device functions as a slave.

In this image capture system, transmission of image data from the memory to the external storage device, and allocation of several pieces of image data transmitted to the external storage device are realized under control of the image capture device. Thus, the external storage device may be a device without a transmission unit or an allocation unit.

According to a method of controlling an image capture device of the present invention, the method controls the image capture device having an image shooting function, including a memory in which image data obtained by image shooting is stored, and being connected to an external storage device. The method includes the steps of: transmitting several pieces of image data stored in the memory at a time to the external storage device; and allocating the several pieces of image data transmitted to the external storage device to one or a plurality of directories according to a certain index.

In this method, several pieces of image data stored in the memory are transmitted at a time to the external storage device. This reduces transmission time, compared to the case where other processing is performed in parallel with data transmission. After the transmission, the transmitted several pieces of image data are allocated to one or a plurality of directories according to a certain index. So, image data stored in the external storage device can be managed according to the certain index.

As described above, according to the image capture device and the method of controlling the same of the present invention, the time of transmission of image data is reduced, and image data can be managed by the image capture device.

DETAILED DESCRIPTION OF THE EMBODIMENTS

A preferred embodiment of the present invention is described in detail below with reference to drawings.

1. Configuration of Image Capture System

An image capture system includes a digital camera, a cradle 2, an external hard disk device 3, a monitor television receiver 4, and a speaker 5. In the below, each component of the image capture system is described in detail.

1-1. Digital Camera

Figure 1:
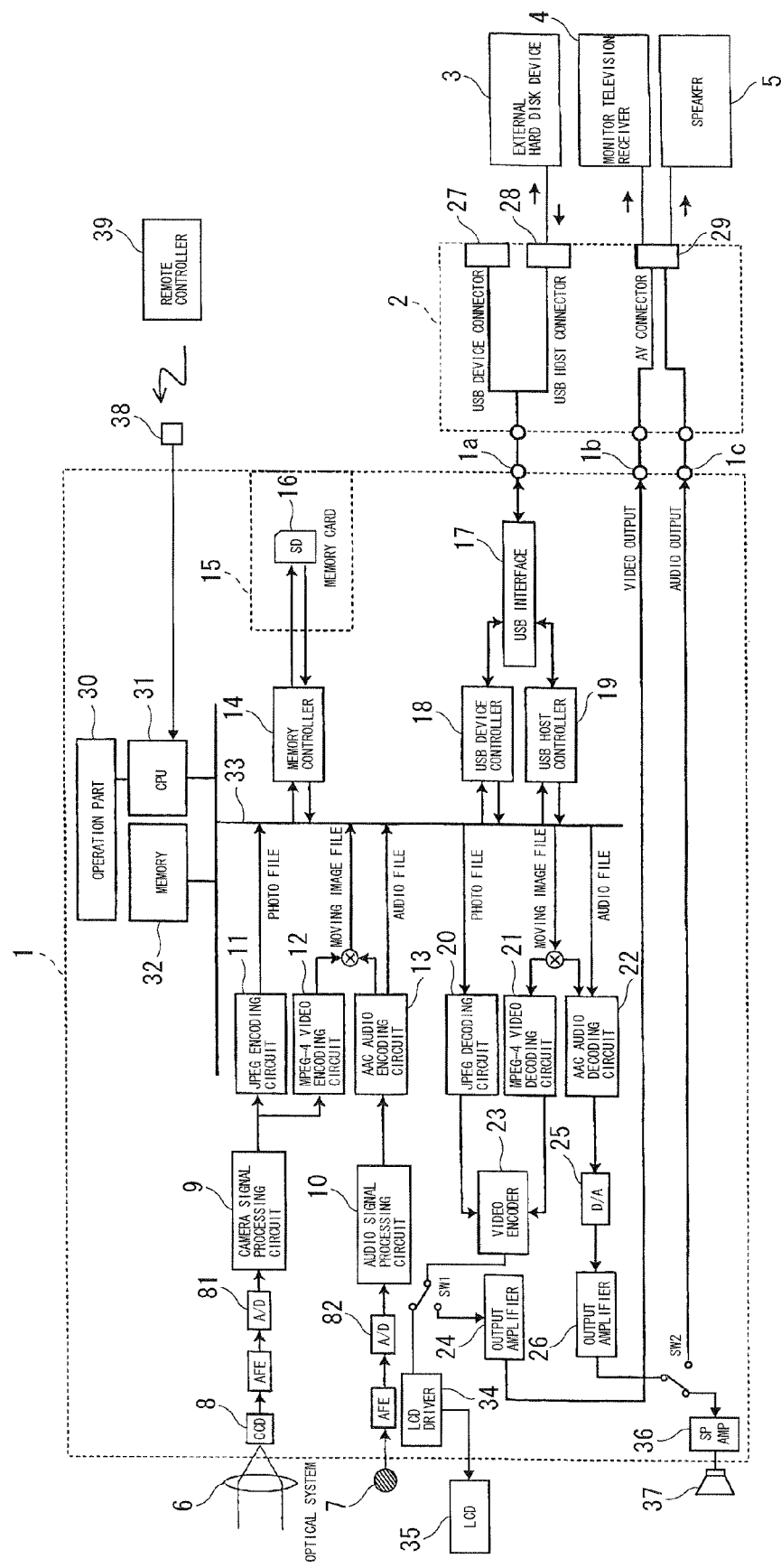
FIG. 1 is a block diagram of an image capture system according to a preferred embodiment of the present invention.

As shown in FIG. 1, the digital camera according to the preferred embodiment of the present invention includes a camera body 1, an optical system 6, a microphone 7, a liquid crystal display (LCD) 35, a speaker 37, a receiver 38, a USB terminal 1a, a video output terminal 1b, and an audio output terminal 1c.

The camera body 1 has an operation part 30 for operating the digital camera. The camera body 1 also has various components operated under control of the operation part 30. More specifically, the camera body 1 has a CPU 31, a memory 32, a CCD 8, A/D conversion circuits 81 and 82, a camera signal processing circuit 9, an audio signal processing circuit 10, a JPEG encoding circuit 11, an MPEG-4 video encoding circuit 12, an AAC audio encoding circuit 13, a JPEG decoding circuit 20, an MPEG-4 video decoding circuit 21, an AAC audio decoding circuit 22, a video encoder 23, output amplifiers 24 and 26, a D/A conversion circuit 25, an LCD driver 34, a speaker amplifier 36, a memory controller 14, a card drive 15, a USB interface 17, a USB deriver controller 18, a USB host controller 19, and switches SW1 and SW2. In the below, each component of the camera body 1 is described in detail.

A remote controller 39 may control the operation of the digital camera. In this case, the receiver 38 receives a control signal from the remote controller 39 and supplies the received control signal to the CPU 31, thereby controlling the digital camera. The control signal may be an infrared signal.

<CPU 31 and Memory 32>

A control procedure to be executed by the CPU 31 is written in the memory 32. The CPU 31 reads a control procedure corresponding to a control signal from the operation part 30 from the memory 32, and executes various kinds of controls according to the read control procedure. The CPU 31 and the memory 32 are connected to each other through a bus 33.

<CCD 8 and Camera Signal Processing Circuit 9>

The CCD 8 converts image signal light received from the optical system 6 to an electric signal (analog signal). The electric signal is converted to a digital signal in the A/D conversion circuit 81. The camera signal processing circuit 9 performs camera signal processing upon the digital signal, and supplies a resultant signal as image data to the JPEG encoding circuit 11 and to the MPEG-4 video encoding circuit 12.

<Audio Signal Processing Circuit 10>

An audio signal (analog signal) output from the microphone 7 is converted to a digital signal in the A/D conversion circuit 82. The audio signal processing circuit 10 performs audio signal processing upon the digital signal, and supplies a resultant signal as audio data to the AAC audio encoding circuit 13.

<JPEG Encoding Circuit 11 and MPEG-4 Video Encoding Circuit 12>

The output terminal of the JPEG encoding circuit 11 is connected to the bus 33. Under control of the CPU 31, the JPEG encoding circuit 11 encodes image data to create a photographic file. The photographic file created in the JPEG encoding circuit 11 is supplied through the bus 33 to the memory controller 14, and to the JPEG decoding circuit 20.

The output terminal of the MPEG-4 video encoding circuit 12 is connected to the bus 33. Under control of the CPU 31, the MPEG-4 video encoding circuit 12 encodes image data to create a moving image file. The moving image file created in the MPEG-4 video encoding circuit 12 is supplied through the bus 33 to the memory controller 14, and to the MPEG-4 video decoding circuit 21.

<AAC Audio Encoding Circuit 13>

The output terminal of the AAC audio encoding circuit 13 is connected to the bus 33. Under control of the CPU 31, the AAC audio encoding circuit 13 encodes audio data to create an audio file. The audio file created in the AAC audio encoding circuit 13 is supplied through the bus 33 to the memory controller 14, and to the AAC audio decoding circuit 22. Audio data of a sound captured by the microphone 7 during shooting of moving images is encoded in the AAC audio encoding circuit 13, and is thereafter incorporated into a moving image file created in the MPEG-4 video encoding circuit 12.

<Memory Controller 14 and Card Drive 15>

The card drive 15 is connected through the memory controller 14 to the bus 33. A memory card 16 such as an SD card can be attached to and detached from the card drive 15. The memory controller 14 writes a photo file supplied from the JPEG encoding circuit 11, a moving image file supplied from the MPEG-4 video encoding circuit 12, and an audio file supplied from the AAC audio encoding circuit 13 to the memory card 16 attached to the card drive 15.

<JPEG Decoding Circuit 20 and MPEG-4 Video Decoding Circuit 21>

The JPEG decoding circuit 20 decodes an encoded photo file, and outputs the decoded photo file to the video encoder 23. The MPEG-4 video decoding circuit 21 decodes an encoded moving image file, and outputs the decoded moving image file to the video encoder 23. The video encoder 23 converts the decoded photo file and the decoded moving image file to image data.

The image data output from the video encoder 23 is selectively supplied either to the LCD driver 34 or to the output amplifier 24 by the switch SW1. The image data supplied to the LCD driver 34 is displayed on the liquid crystal display 35. The image data supplied to the output amplifier 24 passes through the video output terminal 1b to be displayed on the monitor television receiver 4 described later.

<AAC Audio Decoding Circuit 22>

The AAC audio decoding circuit 22 decodes an encoded audio file. The AAC audio decoding circuit 22 also decodes encoded audio data incorporated in a moving image file.

The decoded audio file is converted to an audio signal (analog signal) in the D/A conversion circuit 25, and is thereafter supplied to the output amplifier 26.

The audio signal supplied to the output amplifier 26 is selectively supplied either to the speaker amplifier 36 or to the audio output terminal 1c by the switch SW2. The audio signal supplied to the speaker amplifier 36 is output as a sound from the speaker 37. The audio signal supplied to the audio output terminal 1c is output as a sound from the speaker 5 described later.

<USB Device Controller 18 and USB Host Controller 19>

The USB device controller 18 and the USB host controller 19 are connected in parallel between the bus 33 and the USB interface 17. The USB interface 17 is connected to the USB terminal 1a. The USB host controller 19 outputs a photo file, a moving image file and an audio file (in the below, these files are collectively and simply referred to as "file") to the USB terminal 1a through the USB interface 17.

1-2. Cradle 2

The cradle 2 which is a connection device has a USB device connector 27, a USB host connector 28, and an AV connector 29, and can be connected to the digital camera. More specifically, the cradle 2 is so configured as to realize connection described next.

When the cradle 2 is connected to the digital camera, the USB device connector 27 and the USB host connector 28 are connected to the USB terminal 1a, while the AV connector 29 is connected to the video output terminal 1b and the audio output terminal 1c. The external hard disk device 3 as an external storage device is connected to the USB host connector 28 of the cradle 2. The monitor television receiver 4 and the speaker 5 are connected to the AV connector 29.

1-3. External Hard Disk Device 3

The external hard disk device 3 is connected to the USB host connector 28 of the cradle 2, so that a file output from the USB terminal 1*a* by the USB host controller 19 is stored into the external hard disk device 3.

1-4. Monitor Television Receiver 4 and Speaker 5

The monitor television receiver 4 is connected to the AV connector 29 of the cradle 2. Image data output from the video output terminal 1*b* through the output amplifier 24 is displayed on the monitor television receiver 4.

The speaker 5 is connected to the AV connector 29 of the cradle 2. An audio signal output from the audio output terminal 1*c* through the output amplifier 26 is output from the speaker 5.

2. Control of Digital Camera 2-1. Recording into and Reproduction from Memory Card 16

<Recording into Memory Card 16>

Figure 2:
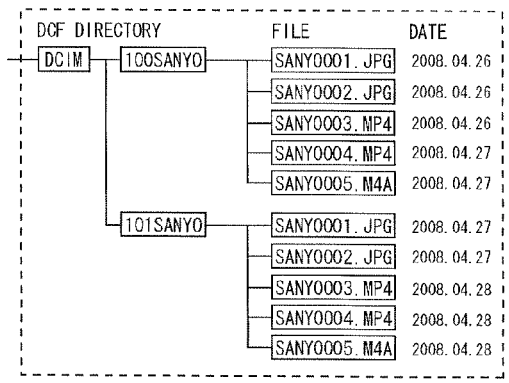
FIG. 2 shows a directory structure formed in a memory card.

A directory structure defined by the DCF (design rule for camera file system) standard (hereinafter referred to as "DCF directory") shown in FIG. 2 is formed in the memory card 16. The DCF directory includes a DCIM directory and archive directories. The archive directories are prepared as containers of files, and are kept under the DCIM directory. The DCIM directory can hold one or plurality of archive directories that are identified by directory names "100SANYO" to "999SANYO," for example. The archive directory can hold one or plurality of files that are identified by file names "SANY0001" to "SANY9999," for example.

Files obtained by shooting are written (recorded) into the memory card 16 under control of the memory controller 14 of the digital camera. The files recorded in the memory card 16 are stored in the archive directories "100SANYO" and "101SANYO" as shown in FIG. 2.

<Reproduction from Memory Card 16>

A file stored in the memory card 16 is read (reproduced) under control of the memory controller 14 following the process below.

In order to reproduce a photograph obtained by shooting by the digital camera, a photo file is read from the memory card 16 under control of the memory controller 14. The photo file thereby read is transferred to the JPEG decoding circuit 20 and the video encoder 23, and is then displayed as a still image on the liquid crystal display 35 of the digital camera, or on the monitor television receiver 4 connected to the cradle 2 (FIG. 1).

In order to reproduce moving images obtained by shooting by the digital camera, a moving image file is read from the memory card 16 under control of the memory controller 14. The moving image file thereby read is transferred to the MPEG-4 video decoding circuit 21 and the video encoder 23, and is then displayed as moving images on the liquid crystal display 35 or on the monitor television receiver 4. Audio data incorporated in a moving image file is transferred to the AAC audio decoding circuit 22 and the D/A conversion circuit 25, and is then output as a sound from the speaker 37 of the digital camera, or from the speaker 5 connected to the cradle 2. The output of a sound based on audio data incorporated in a moving image file is so controlled that the sound conforms to moving images that are displayed based on the moving image file.

In order to reproduce a sound captured by the digital camera, an audio file is read from the memory card 16 under control of the memory controller 14. The audio file thereby read is transferred to the AAC audio decoding circuit 22 and the D/A conversion circuit 25, and is then output as a sound from the speaker 37 of the digital camera, or from the speaker 5 connected to the cradle 2.

2-2. Data Transmission from Memory Card 16 to External Hard Disk Device 3

<Data Transmission from External Hard Disk Device 3 (Transmission Processing)>

Data is transmitted from the memory card 16 to the external hard disk device 3 in the following way. First, files are read from the memory card 16 under control of the memory controller 14. The files thereby read are output through the USB interface 17 from the USB terminal 1*a* under control of the USB host controller 19, and are then supplied through the USB host connector 28 of the cradle 2 to the external hard disk device 3. As a result, the files read from the memory card 16 are transmitted to the external hard disk device 3.

This process is read as follows: data is transmitted by a transmission unit constituted by the memory controller 14 and the USB host controller 19 of the digital camera.

In data transmission, files are transmitted at a time from the memory card 16 to the external hard disk device 3. During this data transmission, processing except the data transmission, especially such processing as will require high processing power, is not performed. Such batch transmission of files reduces transmission time, compared to the case where other processing is performed in parallel with data transmission.

The transmission unit described above is provided in the digital camera. So, an external storage device with no transmission unit can be employed as the external hard disk device 3.

<Recording into External Hard Disk Device 3>

Figure 3:
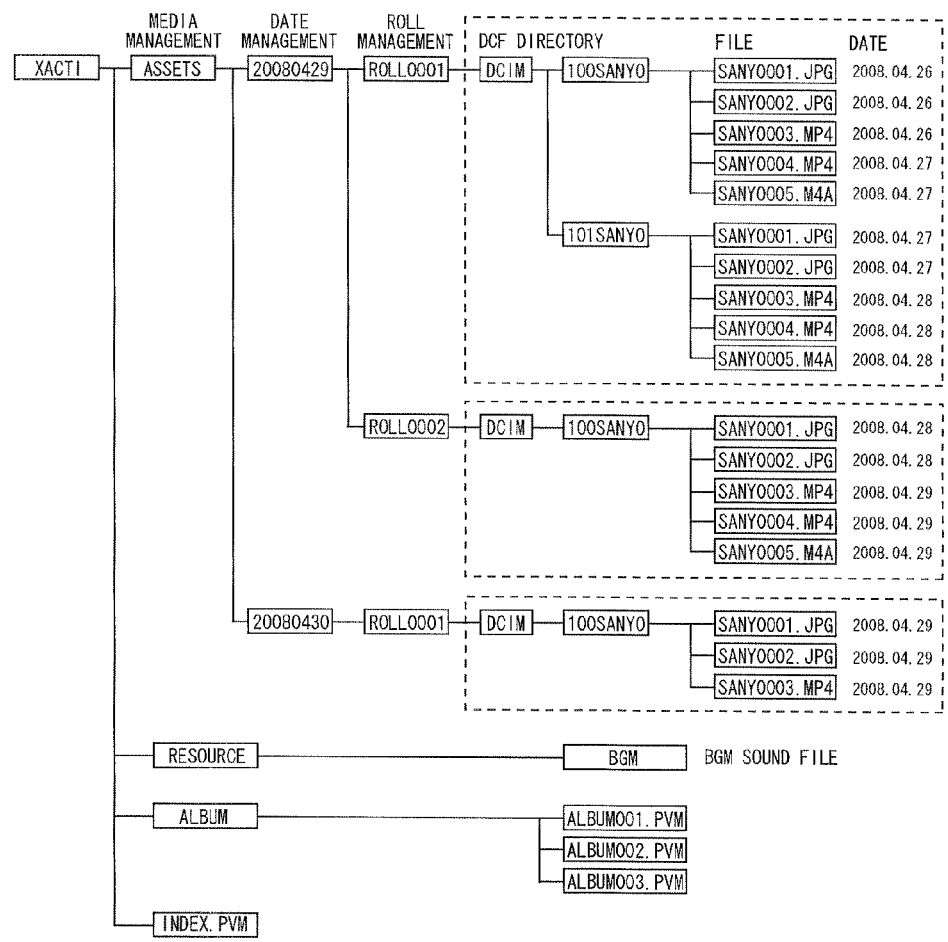
FIG. 3 shows a directory structure formed in an external hard disk device.

A directory structure shown in FIG. 3 is formed in the external hard disk device 3, and which includes a XACTI directory, a media management directory "ASSETS," date management directories, roll management directories, and DCIF directories.

The XACTI directory contains the media management directory "ASSETS." In addition to the media management directory "ASSETS," the XACTI directory contains a directory "RESOURCE," a directory "ALBUM," and an INDEX file "INDEX.PVM."

The media management directory "ASSETS" contains date management directories. A date management directory is intended to manage a date, and contains a roll management directory created on a date managed by the data management directory itself. Thus, a date managed by a date management directory (hereinafter referred to as "date of date management directory"), and a date on which a roll management directory contained in this date management directory is created (hereinafter referred to as "date of roll management directory"), coincide with each other.

The media management directory "ASSETS" can contain one or plurality of date management directories given dates as their directory names. A date management directory can contain one or plurality of roll management directories given directory names including "ROLL0001" to "ROLL9999," for example.

A roll management directory manages files as a group transmitted at a time from the memory card 16 to the external hard disk device 3. A roll management directory is created by one batch transmission. Roll management directories created on the same date are contained in and managed by a date management directory with the same date.

Like in the memory card 16, a DCF directory is created in a roll management directory. A transmitted file is stored in an archive directory (such as "100SANYO") in the DCF directory.

In data transmission, a DCF directory created in the memory card 16 is moved or copied as it is to a roll management directory. Namely, a DCF directory created in the memory card 16 is incorporated as it is into a directory structure formed in an external storage device. In FIG. 3, the directory structure in the memory card 16 shown in FIG. 2 is incorporated as it is into a roll management directory "ROLL0001" under a date management directory "20080429" in the external hard disk device 3.

According to the data transmission described above, a directory structure formed in the memory card 16 is maintained as it is in the external hard disk device 3 as a result of the data transmission. So, transmission time is reduced.

Further, as shown in FIG. 3, the directory structure in the memory card 16 shown in FIG. 2 is incorporated as it is into the lowermost level of the directory structure formed in the external hard disk device 3. So, in view of the fact that a directory structure is changed easier in a lower level, the above-described incorporation makes the change of a directory structure easy necessitated by allocation of files described later.

<Setting Relating to Data Transmission>

Figure 4A:
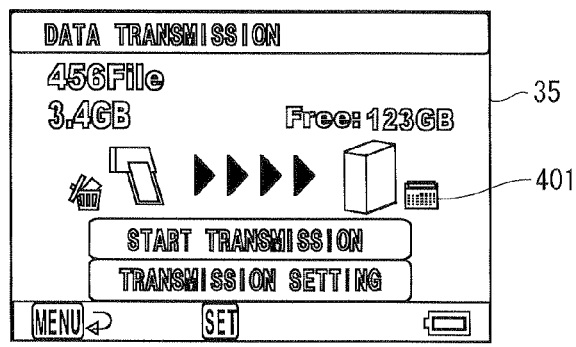
FIGS. 4A to 4D show a series of screens for realizing setting relating to data transmission.

The digital camera described above is so configured that an operator can perform setting relating to the foregoing data transmission by operating the operation part 30 or the remote controller 39 while seeing the liquid crystal display 35. More specifically, in order to perform data transmission, a data transmission screen appears on the liquid crystal display 35 as shown in FIG. 4A. This data transmission screen includes a "start transmission" button for starting data transmission, and a "transmission setting" button for making setting relating to data transmission. An operator selects the "start transmission" button to start data transmission.

Figure 4B:
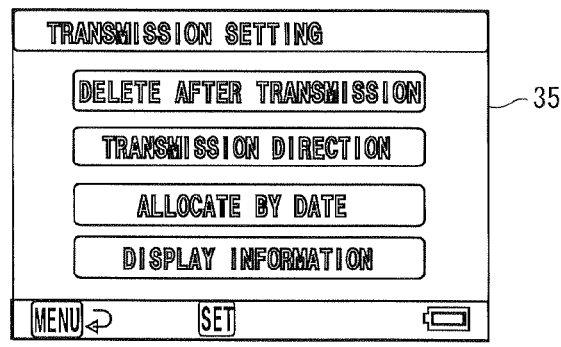

When an operator selects the "transmission setting" button, a transmission setting screen appears on the liquid crystal display 35 as shown in FIG. 4B. The transmission setting screen includes a "delete after transmission" button, a "transmission direction" button, am "allocate by date" button, and a "display information" button.

The "delete after transmission" button and the "display information" button are described first. The "delete after transmission" button is provided to allow an operator to choose whether or not to automatically delete files from the memory card 16 after these files in the memory card 16 are transmitted at a time to the external hard disk device 3. The "display information" button is provided to display information relating to transmission.

The "transmission direction" button is provided to allow an operator to choose whether to transmit files in a direction from the memory card 16 to the external hard disk device 3, or in the opposite direction. When the former direction is chosen, data is transmitted in a way as described above. When the latter direction is chosen, data is transmitted in a way as described in detail later in the section "2-4. Writing back from external hard disk device 3 to memory card 16."

The "allocate by date" button is provided to allow an operator to choose whether or not to automatically start allocation of files by date of shooting after these files are transmitted at a time to the external hard disk device 3. The substance of the allocation by date of shooting is described in detail later in the section "2-3. Allocation in external hard disk device 3."

Figure 4C:
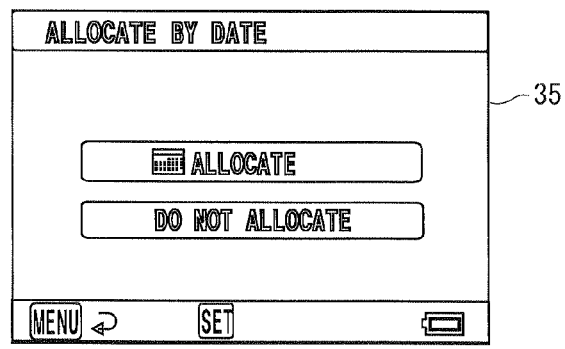
Figure 4D:
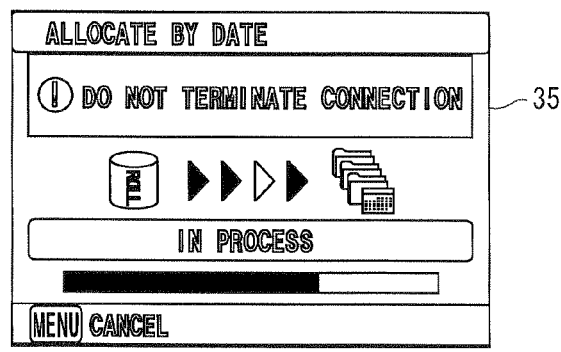

When an operator selects the "allocate by date" button, an allocate-by-date screen appears on the liquid crystal display 35 as shown in FIG. 4C. The allocate-by-date screen includes an "allocate" button and a "do not allocate" button. When the operator selects the "allocate" button, an indication 401 showing that the "allocate" button has been selected appears as shown in FIG. 4A. Then, allocation is automatically started after data transmission. During the allocation by date of shooting, a screen indicating that the allocation is in process appears on the liquid crystal display 35 as shown in FIG. 4D. When the operator selects the "do not allocate" button, allocation is not automatically started after data transmission.

2-3. Allocation in External Hard Disk Device 3

Figure 5:
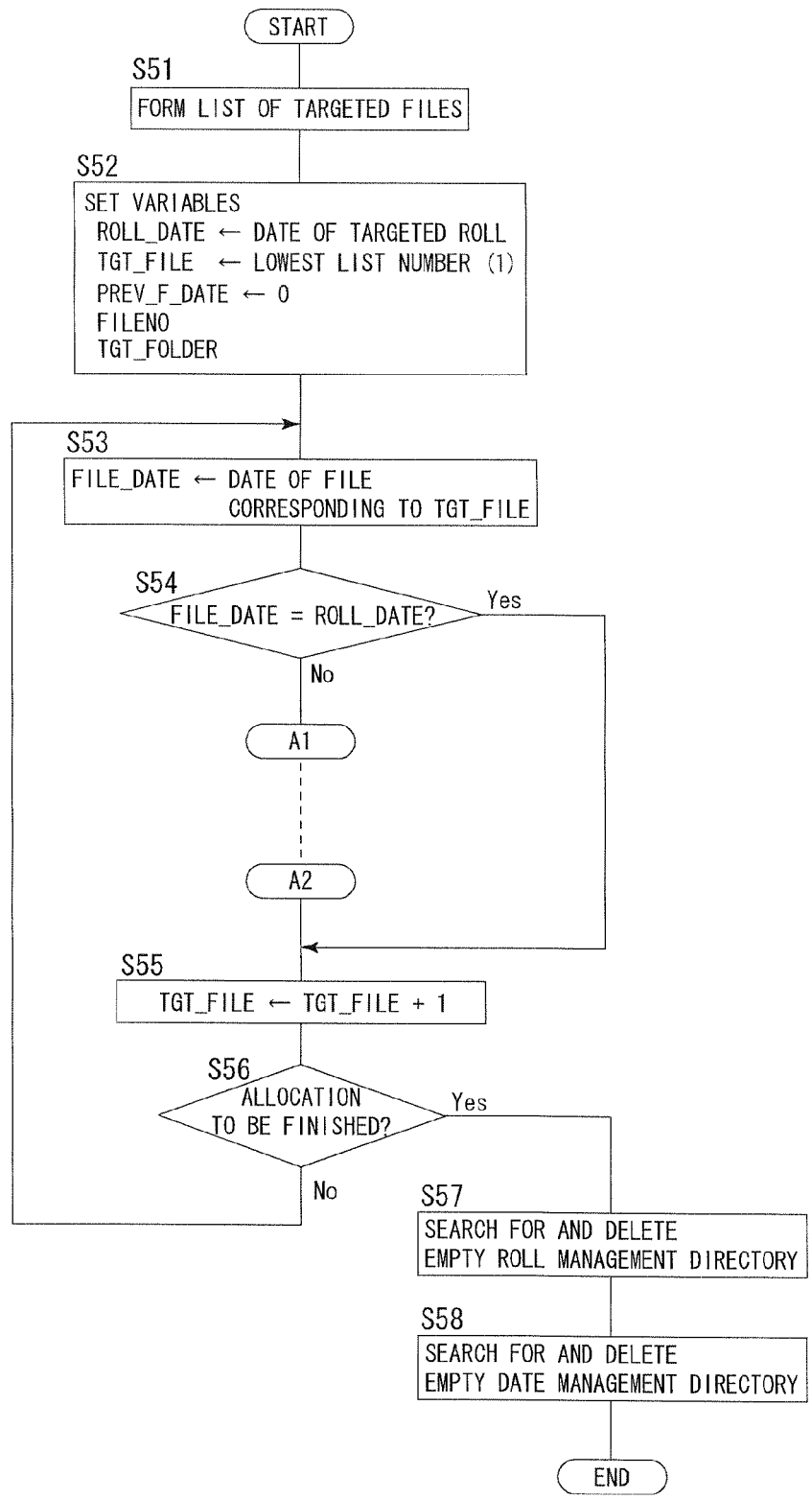
FIG. 5 is a flow diagram for explaining allocation.
Figure 6:
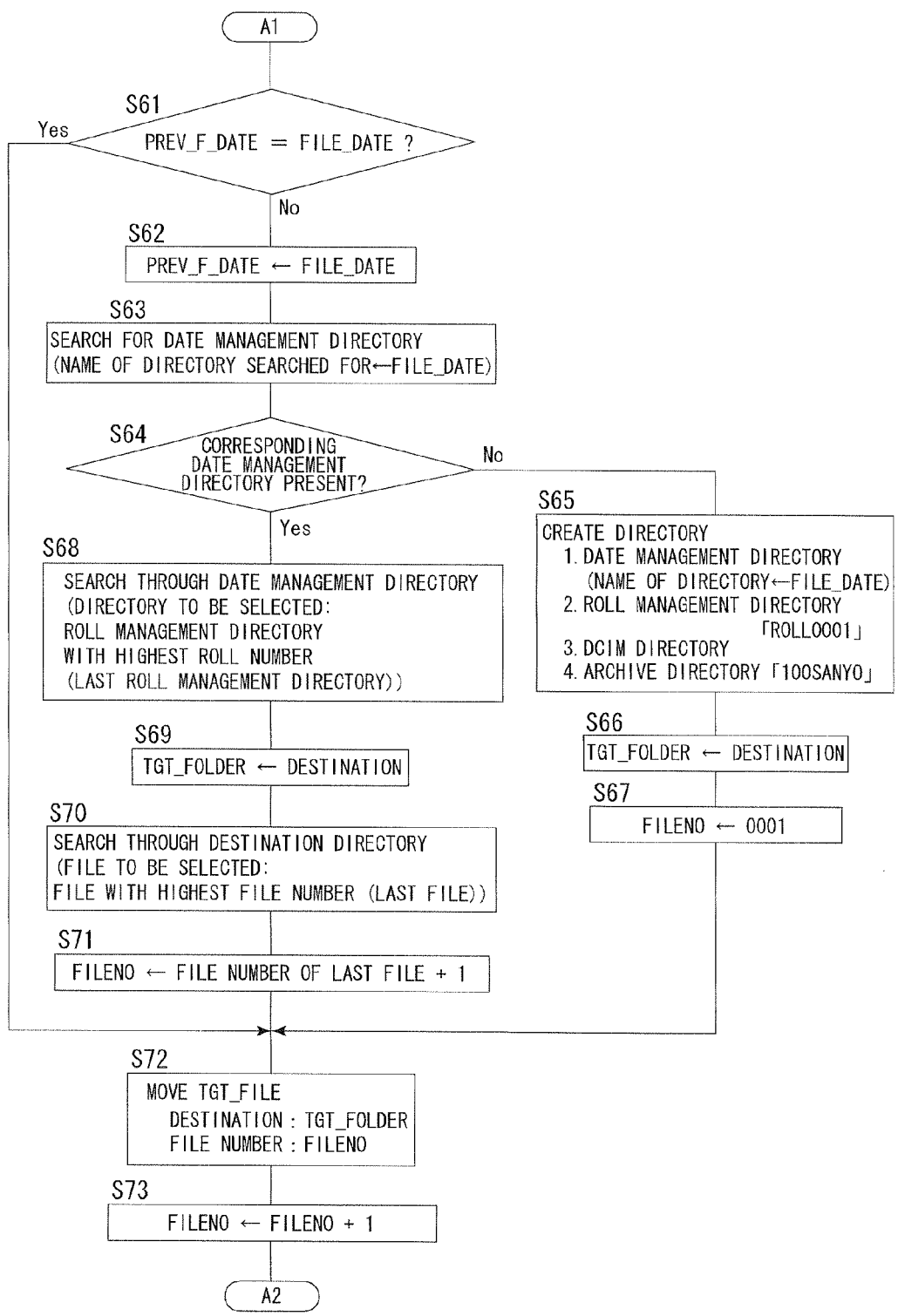
FIG. 6 is a flow diagram including a flow from a connector A1 to a connector A2 shown in FIG. 5.

Allocation of files by date of shooting in the external hard disk device 3 is performed for each roll management directory, and which follows the flow diagrams shown in FIGS. 5 and 6. Allocation of files is performed by an allocation unit constituted by the CPU 31 and the memory 32 shown in FIG. 1.

2-3-1. Allocation Automatically Started after Transmission

Described first is allocation of files transmitted at a time that is automatically started after data transmission. Here, the DCF directory (FIG. 2) transmitted in its entirety from the memory card 16 is incorporated as it is into a roll management directory "ROLL0001" under a date management directory "20080429" as shown in FIG. 3, and the roll management directory "ROLL0001" is targeted for allocation. The allocation is described in detail with reference to the flow diagrams (FIGS. 5 and 6) and FIGS. 7 to 9. In the following, a roll management directory under a date management directory is identified as "date management directory name/roll management directory name." As an example, the roll management directory "ROLL0001" under the date management directory "20080429" is referred to as a roll management directory "20080429/ROLL0001."

<Initial Setting>

Figure 7:
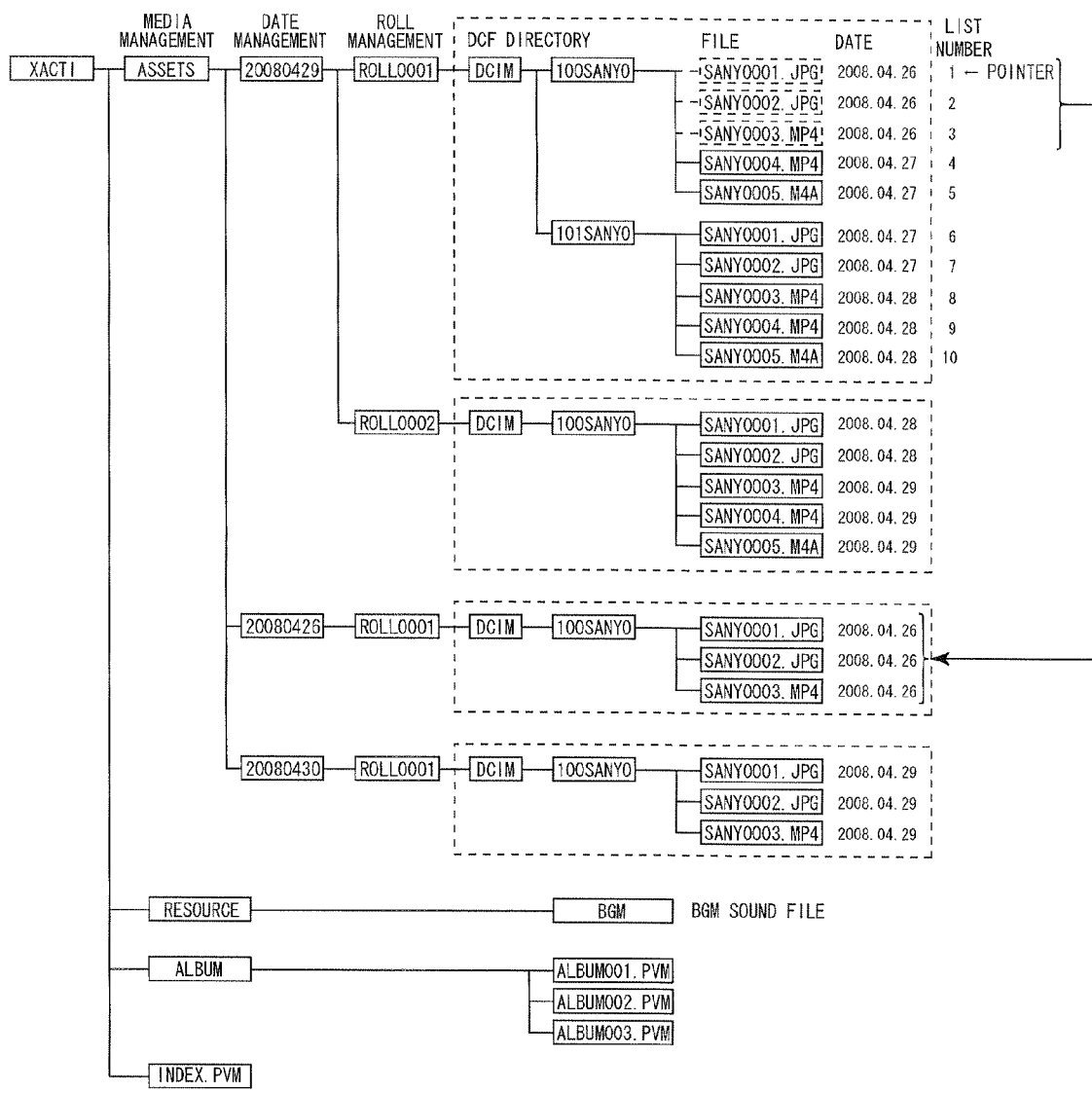
FIGS. 7 to 12 show how a directory structure changes as a result of allocation.

When allocation is started (FIG. 5), a list of files in a roll management directory targeted for the allocation is formed in step S51. For the allocation of the roll management directory "20080429/ROLL0001," files in the roll management directory "20080429/ROLL0001" are given list numbers "1" to "10" as shown in FIG. 7.

After step S51, variables to be used for the allocation are defined in step S52. More specifically, variables "ROLL_DATE," "TGT_FILE," "PREV_F_DATE," "FILE_DATE," "FILENO," and "TGT_FOLDER" are defined. The details of the variables are described next.

The variable "ROLL_DATE" is a variable to which the date of a roll management directory targeted for allocation, namely the date of a date management directory containing this roll management directory is assigned. The assignment of a date is performed in step S52. In the allocation of the roll management directory "20080429/ROLL0001," the date "20080429" of the roll management directory "20080429/ROLL0001" (FIG. 7) is assigned to the variable "ROLL_DATE" in step S52.

The variable "TGT_FILE" is a variable to which a list number of a file targeted for allocation is assigned. In step S52, the list number "1" is assigned to the variable "TGT_FILE." Then, a pointer indicating a targeted file is placed onto a file with the list number "1" as shown in FIG. 7.

The variable "PREV_F_DATE" is a variable used to determine whether or not the date of a file allocated immediately before and the date of a file targeted for the allocation are the same. The date of a file is assigned to the variable "PREV_F_DATE." In step S52, "0" is assigned as an initial value to the variable "PREV_F_DATE." The "date of a file" is the date of shooting of an image contained in this file, which is also applied to the following cases.

The variable "FILE_DATE" is a variable to which the date of a file is assigned. The variable "FILENO" is a variable to which a number contained in a file name (hereinafter referred to as "file number") is assigned. The variable "TGT_

FOLDER" is a variable to which a destination to which a file is to be moved in allocation is assigned.

<Allocation of First File>

After step S52, the date of a file corresponding to the list number "1" assigned to the variable "TGT_FILE" (first file) is assigned to the variable "FILE_DATE" in step S53. In the allocation of a first file "SANY0001.JPG" in the roll management directory "20080429/ROLL0001" (FIG. 7), the date of the first file "20080426" is assigned to the variable "FILE_DATE." In FIG. 7, and also in FIGS. 8 to 12, the dates of files are given on the right sides of the file names.

After step S53, it is determined in step S54 whether or not the variable "FILE_DATE" coincides with the variable "ROLL_DATE." Namely, it is determined whether or not the date of a file targeted for the allocation coincides with the date of a roll management directory in which this file is stored. In the allocation of the first file "SANY0001.JPG," it is determined in step S54 that the date "20080426" assigned to the variable "FILE_DATE" does not coincide with the date "20080429" assigned to the variable "ROLL_DATE." In this case, the allocation flow passes through a connector A1 to go to step S61 (FIG. 6).

In step S61, it is determined whether or not the variable "PREV_F_DATE" coincides with the variable "FILE_DATE." Namely, it is determined whether or not the date of a file allocated immediately before and the date of the file targeted for the allocation are the same. This makes it possible to determine whether or not a destination to which the file targeted for the allocation is to be moved is already designated by the variable "TGT_FOLDER."

In the allocation of the first file "SANY0001.JPG," it is determined in step S61 that "0" assigned to the variable "PREV_F_DATE" does not coincide with the date "20080426" assigned to the variable "FILE_DATE." In this case, the allocation flow goes to step S62.

In step S62, the date assigned to the variable "FILE_DATE" is assigned to the variable "PREV_F_DATE," thereby updating the variable "PREV_F_DATE." In the allocation of the first file "SANY0001.JPG," the variable "PREV_ F_DATE" is updated by the date "20080426" assigned to the variable "FILE_DATE." Then, in the subsequent file allocation, it is determined in step S61 that the variable "PREV_ F_DATE" coincides with the variable "FILE_DATE" with regard to files "SANY0002.JPG" and "SANY0003.MP4" (FIG. 7) with the same date "200080426" as that of the first file "SANY0001.JPG" targeted for the present allocation. So, in the allocation of the files "SANY0002.JPG" and "SANY0003.MP4," the allocation flow goes to step S72.

After step S62, a date management directory with the same date as that of the file targeted for the allocation is searched for in step S63. Next, it is determined in step S64 whether or not a corresponding date management directory is present as a result of the search in step S63.

In the allocation of the first file "SANY0001.JPG," a date management directory "20080426" with a date same as the date "20080426" of the first file "SANY0001.JPG" is searched for in step S63. The date management directory "20080426" is not present in the external hard disk device 3 immediately after data transmission as shown in FIG. 3. Thus, the date management directory "20080426" is not detected in step S63, so it is determined in step S64 that the date management directory "20080426" is not present. In this case, the allocation flow goes to step S65.

In step S65, an archive directory "100SANYO" as a destination to which the file targeted for the allocation is to be moved is created. More specifically, a date management directory with the same date as that of the file targeted for the allocation is created. Next, a roll management directory "ROLL0001" is created under this date management directory. Thereafter a DCF directory constituted by a DCIM directory and the archive directory "100SANYO" is created under the roll management directory "ROLL0001." Step S65 is executed by a directory creation unit constituted by the CPU 31 and the memory 32 shown in FIG. 1

In the allocation of the first file "SANY0001.JPG," the date management directory "20080426" with a date same as the date "20080426" of the first file "SANY0001.JPG" is created. Next, a roll management directory "ROLL0001" is created under the date management directory "20080426." Thereafter a DCF directory constituted by a DCIM directory and an archive directory "100SANYO" is created under the roll management directory "ROLL0001" as shown in FIG. 7.

After step S65, "date management directory name/ROLL0001/DCIM/100SANYO," which is the location of the archive directory "100SANYO" to which the file targeted for the allocation is to be moved, is assigned to the variable "TGT_FOLDER" in step S66. In the allocation of the first file "SANY0001.JPG," a directory name "20080426/ROLL0001/DCIM/100SANYO" is assigned to the variable "TGT_FOLDER."

Then, in step S67, a number "0001" is assigned to the variable "FILENO," and the allocation flow goes to step S72.

In step S72, the file targeted for the allocation is moved to the archive directory "100SANYO" placed at the location "date management directory name/ROLL0001/DCIM/100SANYO" defined in step S66. The file targeted for the allocation is given the number "0001" defined in step S67 as its file number.

In the allocation of the first file "SANY0001.JPG," the first file "SANY0001.JPG" is moved to the archive directory "100SANYO" placed at the location "20080426/ROLL0001/DCIM/100SANYO," and is given a file name "SANY0001.JPG" containing the file number "0001."

After step S72, a number defined by adding "1" to the variable "FILENO," to which the file number given to the file targeted for the allocation in step S72 is assigned, is set as a new variable "FILENO" in step S73. Immediately after the allocation of the first file "SANY0001.JPG," a number "0002" defined by adding "1" to the variable "FILENO" to which the number "0001" is assigned is set as a new variable "FILENO" in step S73.

After step S73, the allocation flow passes through a connector A2 to go to step S55. In step S55, a list number defined by adding "1" to the variable "TGT_FILE" is set as a new variable "TGT_FILE."

Next, it is determined in step S56 whether or not the allocation should be finished. More specifically, it is determined whether or not a file corresponding to the list number set in step S55 is present. When the corresponding file is found to be present in step S56, it is determined that the allocation should be continued. Then, the pointer is placed onto the corresponding file, so the corresponding file is set as a next target for the allocation. When no corresponding file is found to be present in step S56, it is determined that the allocation should be finished.

Immediately after the allocation of the first file "SANY0001.JPG," the list number "2" defined by adding "1" to the variable "TGT_FILE" to which the list number "1" is assigned is set as a new variable "TGT_FILE" in step S55. The roll management directory "20080429/ROLL0001" contains the file "SANY0002.JPG" corresponding to the list number "2" as shown in FIG. 7. So, it is determined in step S56 that the allocation should be continued. In this case, the allocation flow returns to step S53.

<Allocation of Second and Third Files>

The allocation flow returns to step S53 from step S56 to start the allocation of the file "SANY0002.JPG" corresponding to the next list number "2" (second file) Like in the allocation of the file "SANY0001.JPG," in the allocation of the second file "SANY0002.JPG," the date "20080426" of the file "SANY0002.JPG" (FIG. 7) is assigned to the variable "FILE_DATE" in step S53. Thereafter the allocation flow goes to step S54, and then to step S61.

The date "20080426" is assigned to the variable "PREV_F_ DATE." So, it is determined in step S61 that the variable "PREV_F_DATE" coincides with the variable "FILE_ DATE." In this case, the allocation flow goes to step S72.

In step S72, the second file "SANY0002.JPG" is moved to the archive directory "100SANYO" to which the first file "SANY0001.JPG" was also moved. Further, the second file thereby moved is given a file name "SANY0002.JPG" containing the number "0002" defined in step S73 in the allocation of the first file as shown in FIG. 7. Then, the allocation flow goes to step S55, and then to step S56.

The allocation flow returns to step S53 from step S56 to start the allocation of the file "SANY0003.MP4" corresponding to a next list number "3" (third file). Like the second file "SANY0002.JPG," the date of the third file "SANY0003.MP4" is "20080426." So, the third file "SANY0003.MP4" is moved to the archive directory "100SANYO" to which the first file "SANY0001.JPG" was also moved as shown in FIG. 7. The third file thereby moved is given a file name "SANY0003.MP4" containing a number "0003." Then, the allocation flow goes to step S55, and then to step S56.

<Allocation of Fourth to Seventh Files>

Figure 8:
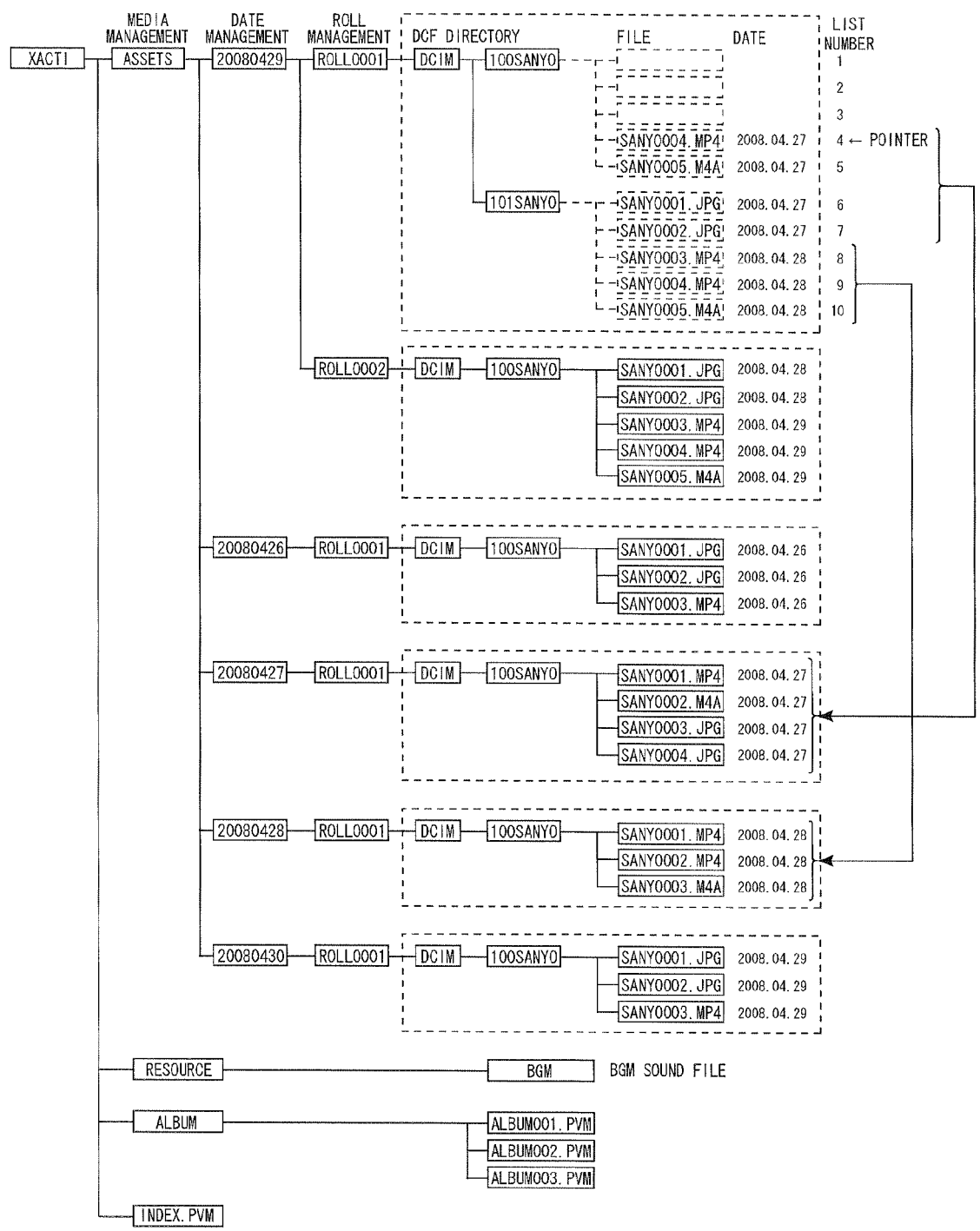

The allocation flow returns to step S53 from step S56 to start the allocation of a file "SANY0004.MP4" corresponding to a next list number "4" (fourth file) as shown in FIG. 8. The allocation of the fourth file "SANY0004.MP4" is the same as that performed on the first file "SANYO00001.JPG."

More specifically, the date "20080427" of the fourth file "SANY0004.MP4" is assigned to the variable "FILE_ DATE" in step S53. Thereafter in step S54, it is determined that the date "20080427" assigned to the variable "FILE_ DATE" does not coincide with the date "20080429" assigned to the variable "ROLL_DATE." Then, the allocation flow goes to step S61.

The date "20080427" of the fourth file "SANY0004.MP4" is different from the date "20080426" of the third file "SANY0003.MP4." So, it is determined in step S61 that the two variables "PREV_F_DATE" and "FILE_DATE" do not coincide with each other, and the allocation flow goes to step S62. In step S62, the variable "PREV_F_DATE" is updated by the date "20080427" of the fourth file "SANY0004.MP4."

Next, a date management directory "20080427" with a date same as the date "20080427" of the fourth file "SANY0004.MP4" is searched for in step S63. The date management directory "20080427" is not present in the external hard disk device 3 immediately after data transmission as shown in FIG. 3. Thus, the date management directory "20080427" is not detected in step S63, so it is determined in step S64 that the date management directory "20080427" is not present. Then, the allocation flow goes to step S65.

In step S65, the date management directory "20080427" with a date same as the date "20080427" of the fourth file "SANY0004.MP4" is created. Next, a roll management directory "ROLL0001" is created under the date management directory "20080427." Thereafter a DCF directory constituted by a DCIM directory and an archive directory "100SANYO" is created under the roll management directory "ROLL0001" as shown in FIG. 8.

After step S65, "20080427/ROLL0001/DCIM/ 100SANYO," which is the location of a directory to which the fourth file "SANY0004.MP4" is to be moved, is assigned to the variable "TGT_FOLDER" in step S66. Then, in step S67, a number "0001" is assigned to the variable "FILENO," and allocation flow goes to step S72.

In step S72, the fourth file "SANY0004.MP4" targeted for the allocation is moved to the archive directory "100SANYO" placed at the location "20080427/ROLL0001/ DCIM/100SANYO" defined in step S66, and is given a file name "SANY0001.MP4" containing the file number "0001" as shown in FIG. 8.

After step S72, a number "0002" defined by adding "1" to the variable "FILENO" to which the number "0001" is assigned is set as a new variable "FILENO" in step S73.

After step S73, the allocation flow passes through the connector A2 to go to step S55. In step S55, a list number "5" defined by adding "1" to the variable "TGT_FILE" to which the list number "4" is assigned is set as a new variable "TGT_ FILE."

As shown in FIG. 8, the roll management directory "20080429/ROLL0001" contains a file "SANY0005.M4A" corresponding to the list number "5" (fifth file). So, it is determined in step S56 that the allocation should be continued. Then, the pointer is placed onto the fifth file "SANY0005.M4A," and the fifth file "SANY0005.M4A" is set as a next target for the allocation. Thereafter the allocation flow returns to step S53.

The allocation flow returns to step S53 from step S56 to start the allocation of the fifth file "SANY0005.M4A." The same allocation as that performed on the second and third files described above is performed on the fifth file "SANY0005.M4A." As a result, the fifth file "SANY0005.M4A" is moved to the archive directory "100SANYO" to which the fourth file "SANY0004.MP4" was also moved. Further, the fifth file thereby moved is given a file name "SANY0002.M4A" containing a file number "0002" as shown in FIG. 8.

Likewise, files "SANY0001.JPG" and "SANY0002.JPG" corresponding to list numbers "6" and "7" (sixth and seventh files) are moved to the archive directory "100SANYO" to which the fourth file "SANY0004.MP4" was also moved. Further, the sixth and seventh files are given respective file names "SANY0003.JPG" and "SANY0004.JPG" containing file numbers "0003" and "0004" respectively as shown in FIG. 8. Then, the allocation flow goes to step S55, and then to step S56.

<Allocation of Eighth to Tenth Files>

The allocation flow returns to step S53 from step S56 to start the allocation of a file "SANY0003.MP4" corresponding to a next list number "8" (eighth file). The same allocation as that performed on the fourth file described above is performed on the eighth file "SANY0003.MP4." As a result, the eighth file "SANY0003.MP4" is moved to an archive directory "100SANYO" under a date management directory "20080428." Further, the eighth file is given a file name "SANY0001.MP4" containing a number "0001" defined in step S67 as shown in FIG. 8. Then, the allocation flow goes to step S55, and then to step S56.

The allocation flow returns to step S53 from step S56 to repeat the allocation on files "SANY0004.MP4" and "SANY005.M4A" corresponding to list numbers "9" and "10" (ninth and tenth files). The same allocation as that performed on the fifth to seventh files described above is performed on the ninth and tenth files "SANY0004.MP4" and "SANY0005.M4A." As a result, the ninth and tenth files "SANY0004.MP4" and "SANY0005.M4A" are both moved to the archive directory "100SANYO" to which the eighth file was also moved. Further, the ninth and tenth files are given respective file names "SANY0002.MP4" and "SANY0003.M4A" containing file numbers "0002" and "0003" respectively as shown in FIG. 8 that are defined in step S73 in the allocation of the respective previous files.

Immediately after the allocation of the tenth file "SANY0005.M4A," a list number "11" defined by adding "1" to the variable "TGT_FILE" to which the list number "10" is assigned is set as a new variable "TGT_FILE" in step S55. Then, the allocation flow goes to step S56.

As shown in FIG. 8, the roll management directory "20080429/ROLL0001" targeted for the allocation does not contain a file corresponding to the list number "11." So, it is determined in step S56 that the allocation should be finished. In this case, the allocation flow goes to step S57.

In step S57, a roll management directory that has been cleared out by the allocation is searched for. An applicable roll management directory, if it is detected, is deleted in step S57. Next, a date management directory that has been cleared out is searched for in step S58. An applicable date management directory, if it is detected, is deleted in step S58. Then, the allocation is completed here.

Figure 9:
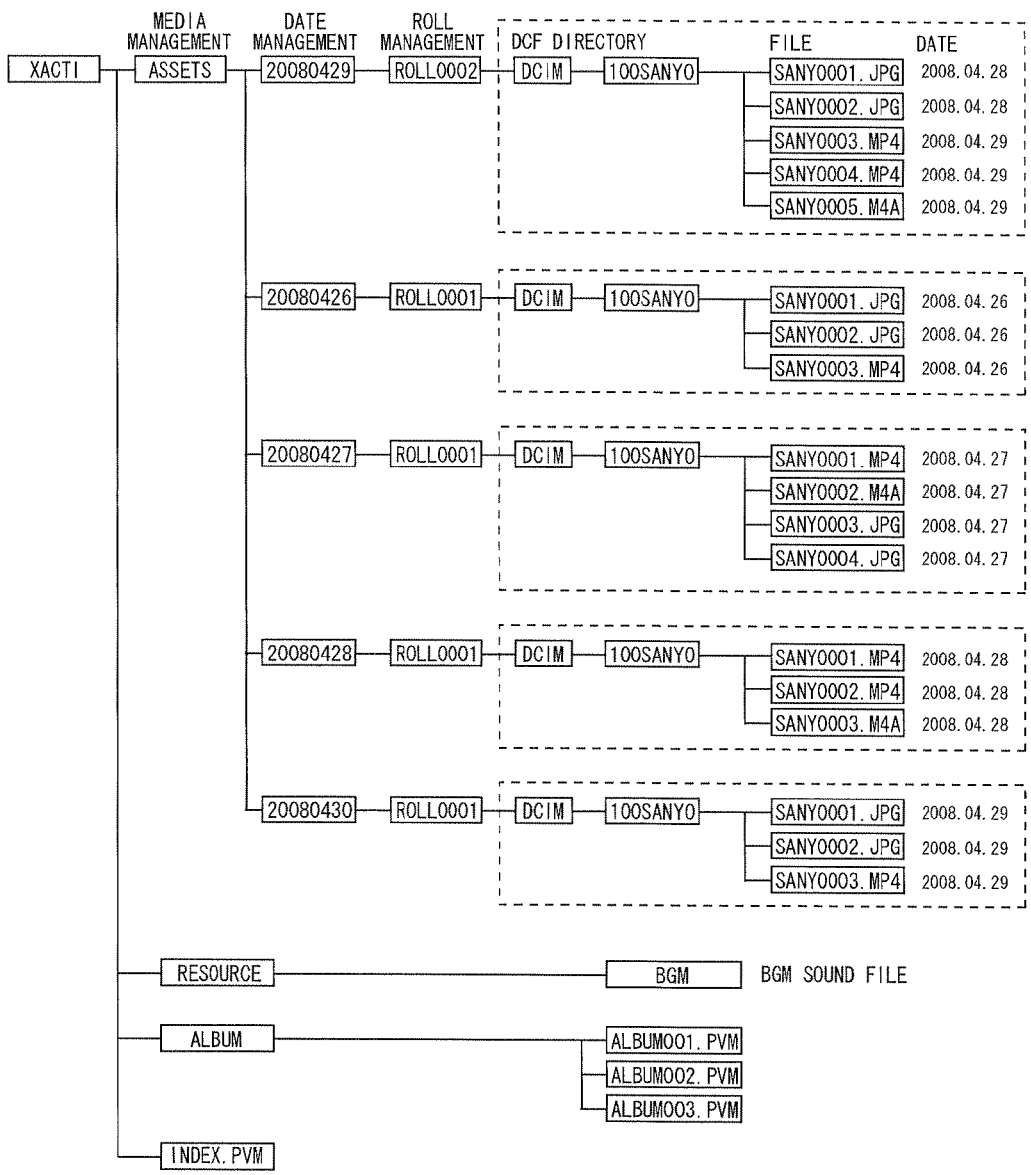

In the allocation of the roll management directory "20080429/ROLL0001," the files corresponding to the list numbers "1" to "10" are all moved to the roll management directories with different dates. So, the roll management directory "20080429/ROLL0001" after the allocation is empty, and is deleted according in step S57 as shown in FIG. 9. A roll management directory "ROLL0002" remains in the date management directory "20080429." So, the date management directory "20080429" remains without being deleted in step S58.

2-3-2. Allocation of Selected Roll Management Directory

Figure 11:
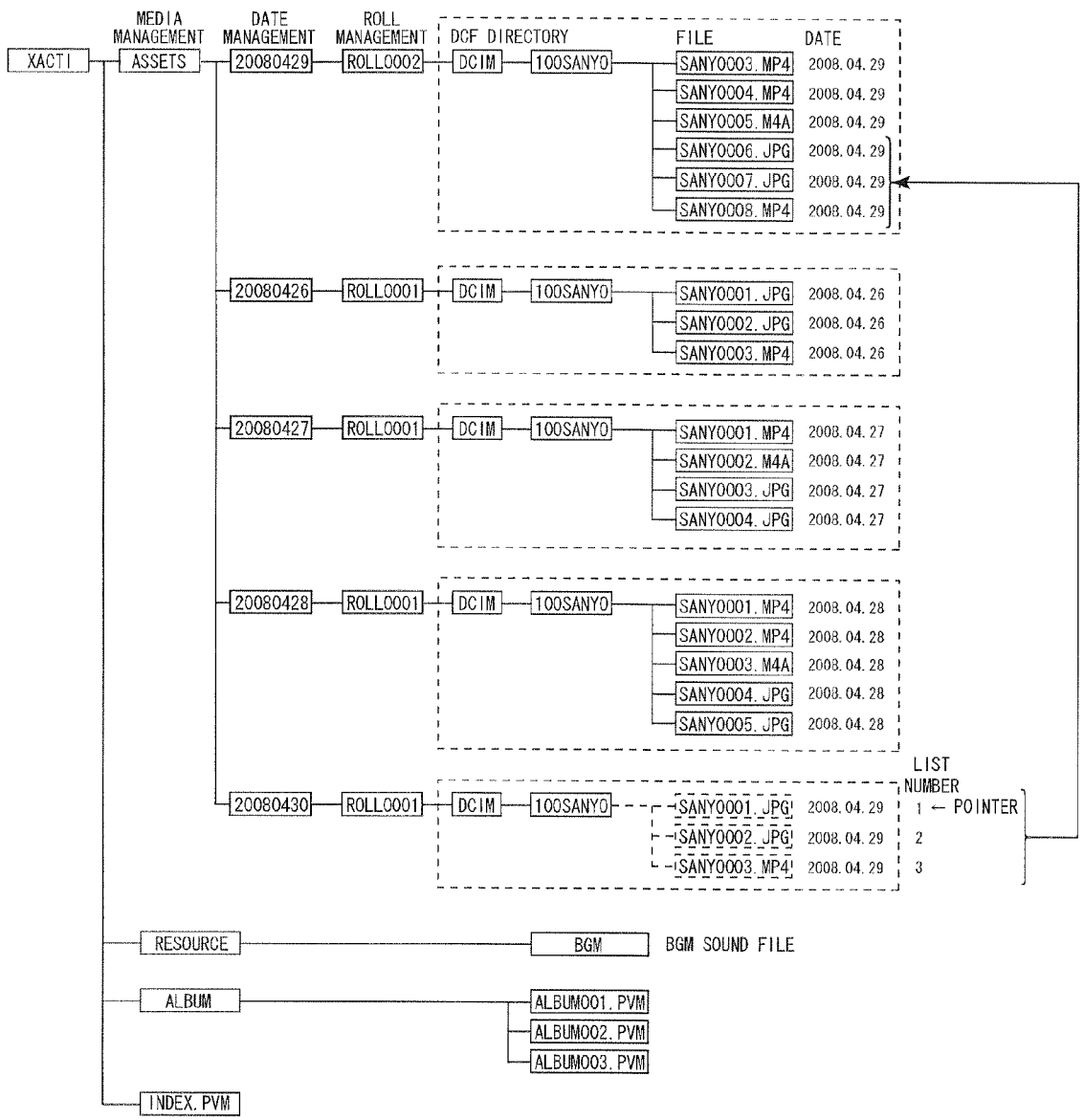
Figure 12:
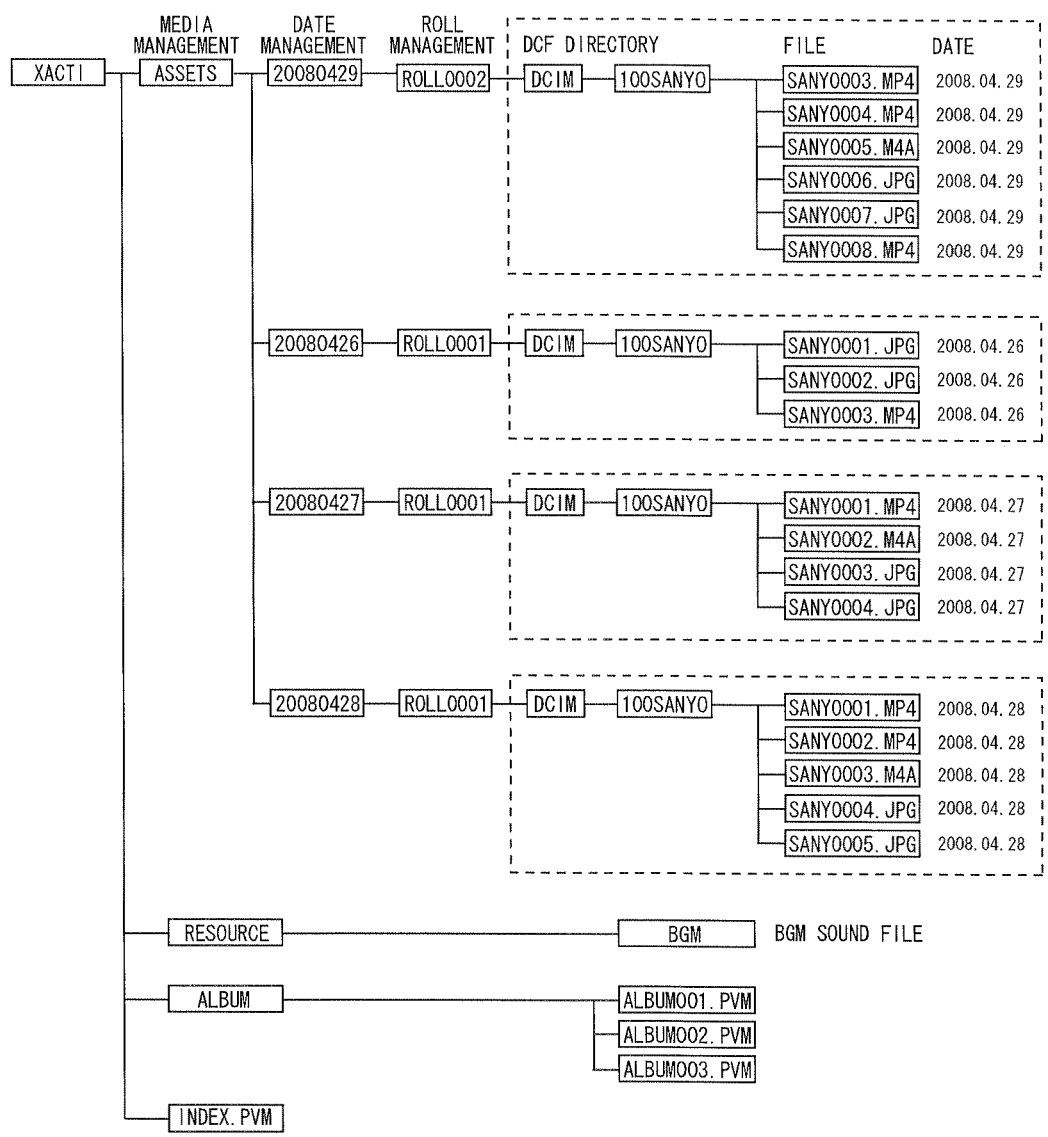
Figure 13:
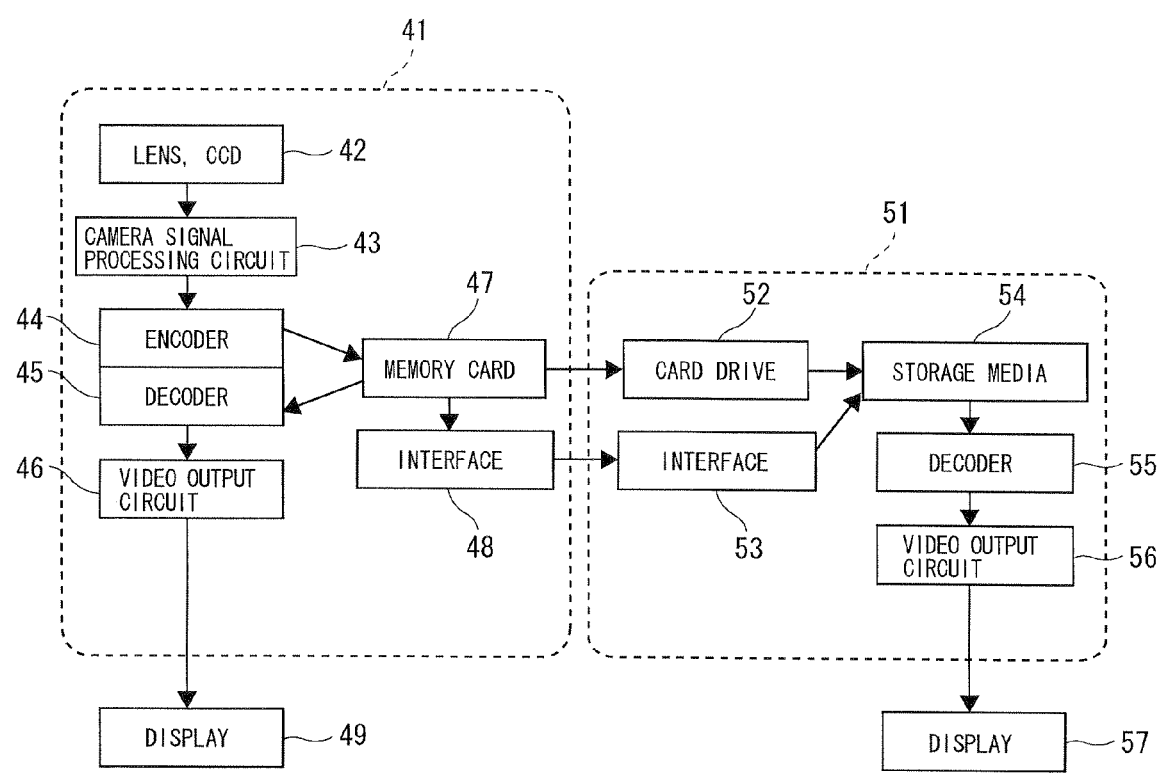
FIG. 13 is a block diagram of a conventional image capture system.

In allocation described next with reference to the flow diagrams (FIGS. 5 and 6) and FIGS. 10 to 12, a roll management directory is selected after data transmission, and the selected roll management directory is subjected to the allocation.

Described first is the allocation where the roll management directory "20080429/ROLL0002" is selected as a target for the allocation.

<Initial Setting>

When the allocation is started (FIG. 5), a list of files in the roll management directory "20080429/ROLL0002" targeted for the allocation is formed in step S51. Then, the files are given list numbers "1" to "5" as shown in FIG. 10.

The variables "ROLL_DATE," "TGT_FILE," "PREV_F_DATE," "FILE_DATE," "FILENO," and "TGT_FOLDER" are thereafter defined in step S52. Here, the date "20080429" of the roll management directory "20080429/ROLL0002" (FIG. 10) is assigned to the variable "ROLL_DATE." The list number "1" is assigned to the variable "TGT_FILE." To the variable "PREV_F_DATE," "0" is assigned as an initial value.

<Allocation of First File>

After step S52, the date "20080428" of a file "SANY0001.JPG" (FIG. 10) corresponding to the list number "1" (first file) is assigned to the variable "FILE_DATE" in step S53. Thereafter it is determined in step S54 that the date "20080428" assigned to the variable "FILE_DATE" does not coincide with the date "20080429" assigned to the variable "ROLL_DATE." So, the allocation flow goes to step S61 (FIG. 6).

In step S61, it is determined that "0" assigned to the variable "PREV_F_DATE" does not coincide with the date "20080428" assigned to the variable "FILE_DATE." In this case, the allocation flow goes to step S62. In step S62, the variable "PREV_F_DATE" is updated by the date "20080428" assigned to the variable "FILE_DATE."

A date management directory with the same date as that of a file targeted for the allocation is searched for in step S63. Next, it is determined in step S64 whether or not a corresponding date management directory is present as a result of the search in step S63.

In the allocation of the first file "SANY0001.JPG," a date management directory "20080428" with a date same as the date "20080428" of the first file "SANY0001.JPG" is searched for in step S63. The date management directory "20080428" is present in the external hard disk device 3 as shown in FIG. 10. Thus, the date management directory "20080428" is detected in step S63, so it is determined in step S64 that the date management directory "20080428" is present. In this case, the allocation flow goes to step S68.

In step S68, a roll management directory to which the file targeted for the allocation is to be moved is selected from the date management directory detected in step S63. Here, a roll management directory with the highest roll number (hereinafter referred to as "last roll management directory") is selected as a destination to which the file is to be moved.

Thereafter in step S69, "date management directory name/last roll management directory name/DCIM/100SANYO," which is the location of an archive directory "100SANYO" under the last roll management directory and to which the file targeted for the allocation is to be moved, is assigned to the variable "TGT_FOLDER."

In the allocation of the first file "SANY0001.JPG," the roll management directory "20080428/ROLL0001" under the date management directory "20080428" is selected as the last roll management directory in step S68. Then, the location "20080428/ROLL0001/DCIM/100SANYO" of the destination directory is assigned to the variable "TGT_FOLDER."

After step S69, a file with the highest file number (hereinafter referred to as "last file") is selected in step S70 from files in the archive directory "100SANYO" placed at the location "date management directory name/last roll management directory name/DCIM/100SANYO" defined in step S69. Next, a number defined by adding "1" to the file number of the last file is assigned to the variable "FILENO" in step S71.

In the allocation of the first file "SANY0001.JPG," the last file "SANY0003.M4A" with the highest file number is selected in step S70 from the files in the archive directory "100SANYO" placed at the location "20080428/ROLL0001/DCIM/100SANYO" defined in step S69. Next, a number "0004" defined by adding "1" to the file number "0003" of the last file "SANY0003.M4A" is assigned to the variable "FILENO" in step S71.

After step S71, and in step S72, the file targeted for the allocation is moved to the archive directory "100SANYO" placed at the location "date management directory name/last roll management directory name/DCIM/100SANYO" defined in step S69. Further, the file targeted for the allocation is given the file number defined in step S71.

Figure 10:
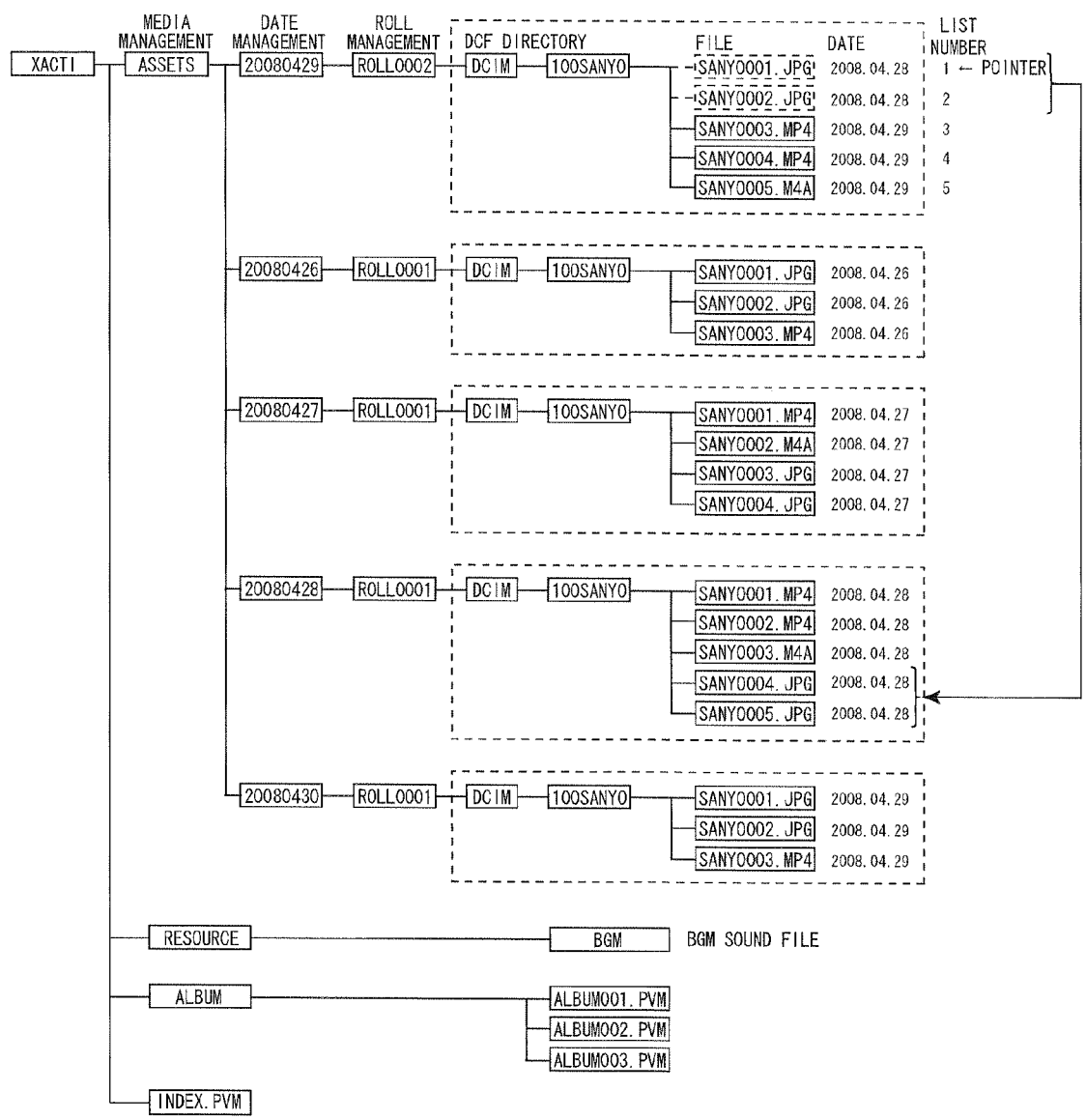

In the allocation of the first file "SANY0001.JPG," as shown in FIG. 10, the first file "SANY0001.JPG" is moved to the archive directory "100SANYO" placed at the location "20080428/ROLL0001/DCIM/100SANYO," and is given a file name "SANY0004.JPG" containing the file number "0004" in step S72.

After step S72, a number defined by adding "1" to the variable "FILENO," to which the file number given to the file targeted for the allocation in step S72 is assigned, is set as a new variable "FILENO" in step S73. Immediately after the allocation of the first file "SANY0001.JPG," a number "0005" defined by adding "1" to the variable "FILENO" to which the number "0004" is assigned is set as a new variable "FILENO" in step S73.

After step S73, the allocation flow passes through the connector A2 to go to step S55. Immediately after the allocation of the first file "SANY0001.JPG," a list number "2" defined by adding "1" to the variable "TGT_FILE" to which the list number "1" is assigned is set as a new variable "TGT_FILE."

As shown in FIG. 10, a file "SANY0002.JPG" corresponding to the list number "2" (second file) is present in the roll management directory "200800429/ROLL0002." So, it is determined in step S56 that the allocation should be continued. Then, the pointer is placed onto the second file "SANY0002.JPG," and the second file "SANY0002.JPG" is set as a next target for the allocation. Thereafter the allocation flow returns to step S53.

<Allocation of Second File>

The allocation flow returns to step S53 from step S56 to start the allocation of the file "SANY0002.JPG" corresponding to the next list number "2" (second file). In the allocation of the second file "SANY0002.JPG," the date "20080428" of the file "SANY0002.JPG" (FIG. 10) is assigned to the variable "FILE_DATE" in step S53. Thereafter the allocation flow goes to step S54, and then to step S61.

The date "20080428" is assigned to the variable "PREV_F_ DATE." So, it is determined in step S61 that the variable "PREV_F_DATE" coincides with the variable "FILE_ DATE." In this case, the allocation flow goes to step S72.

In step S72, the second file "SANY0002.JPG" is moved to the archive directory "100SANYO" to which the first file "SANY0001.JPG" was also moved as shown in FIG. 10. Further, the second file thereby moved is given a file name "SANY0005.JPG" containing the number "0005" defined in step S73 in the allocation of the first file. Then, the allocation flow goes to step S55, and then to step S56.

<Allocation of Third to Fifth Files>

The allocation flow returns to step S53 from step S56 to start the allocation of a file "SANY0003.MP4" corresponding to a next list number "3" (third file). In the allocation of the third file "SANY0003.MP4," the date "20080429" of the file "SANY0003.MP4" (FIG. 10) is assigned to the variable "FILE_DATE" in step S53. Thereafter the allocation flow goes to step S54.

In step S54, it is determined that the date "20080429" assigned to the variable "FILE_DATE" coincides with the date "20080429" assigned to the variable "ROLL_DATE." In this case, the third file "SANY0003.MP4" targeted for the allocation remains in the roll management directory "20080429/ROLL0002" in which the third file "SANY0003.MP4" has been stored.

Namely, the file "SANY0003.MP4" with a date same as the date "20080429" of the roll management directory "20080429/ROLL0002," and which is one of files stored in the roll management directory "20080429/ROLL0002," continues to be stored in the roll management directory "20080429/ROLL0002." The dates of shooting of files "SANY0004.MP4" and "SANY0005.M4A" corresponding to list numbers "4" and "5" are also "20080429," so the files "SANY0004.MP4" and "SANY0005.M4A" also remain in the roll management directory "20080429/ROLL0002."

Described next is the allocation where a roll management directory "20080430/ROLL0001" is selected as a target for the allocation. This allocation follows the same process as that of the allocation of the first file "SANYO0001.JPG" and the second file "SANY0002.JPG" in the roll management directory "20080429/ROLL0002."

More specifically, the dates of shooting of files "SANY0001.JPG," "SANY0002.JPG," and "SANY0003.MP4" are all "20080429." So, the files "SANY0001.JPG," "SANY0002.JPG," and "SANY0003.MP4" are moved to the archive directory "100SANYO" under the roll management directory "20080429/ROLL0002" under the already existing date management directory "20080429." The files "SANY0001.JPG," "SANY0002.JPG," and "SANY0003.MP4" are given respective file names "SANY0006.JPG," "SANY0007.JPG" and "SANY0008.MP4" containing file numbers "0006," "0007," and "0008" respectively.

2-4. Writing Back from External Hard Disk Device 3 to Memory Card 16

Writing back from the external hard disk device 3 to the memory card 16 is performed as follows. First, a specific file is read from the external hard disk device 3 under control of the USB host controller 19. Then, the read file is written back to the memory card 16 under control of the memory controller 14.

2-5. Reproduction from External Hard Disk Device 3

Reproduction of a file stored in the external hard disk 3 is realized as follows under control of the USB host controller 19.

For reproduction of a photo file stored in the external hard disk device 3, the photo file is read from the external hard disk device 3 under control of the USB host controller 19. The read photo file is passed to the JPEG decoding circuit 20 and the video encoder 23, and is thereafter displayed as a still image on the liquid crystal display 35 of the digital camera, or on the monitor television receiver 4 connected to the cradle 2.

For reproduction of a moving image file stored in the external hard disk device 3, the moving image file is read from the external hard disk device 3 under control of the USB host controller 19. The read moving image file is passed to the MPEG-4 video decoding circuit 21 and the video encoder 23, and is thereafter displayed as moving images on the liquid crystal display 35, or on the monitor television receiver 4. Audio data incorporated in the moving image file is passed to the AAC audio decoding circuit 22 and the D/A conversion circuit 25, and is thereafter output as a sound from the speaker 37 of the digital camera, or from the speaker 5 connected to the cradle 2. The output of a sound based on audio data incorporated in a moving image file is so controlled that this sound conforms to moving images that are displayed based on this moving image file.

For reproduction of an audio file stored in the external hard disk device 3, the audio file is read from the external hard disk device 3 under control of the USB host controller 19. The read audio file is passed to the AAC audio decoding circuit 22 and the D/A conversion circuit 25, and is thereafter output as a sound from the speaker 37 of the digital camera, or from the speaker 5 connected to the cradle 2.

In the allocation described above (FIGS. 5 and 6), after files are transmitted from the memory card 16 to the external hard disk device 3, the files are allocated to one or a plurality of directories (date management directories) according to date of shooting. So, files stored in the external hard disk device 3 can be managed according to date of shooting.

In step S54 of the allocation, a file with a date same as the date of a roll management directory, and which is one of files stored in this roll management directory, continues to be stored in this roll management directory. So, this file is not required to be moved to a different directory in the allocation thereof, thereby simplifying file allocation.

In step S65 of the allocation, a date management directory corresponding to the date of shooting of a file targeted for the allocation is created if such a date management directory is not present. Thus, the allocation of image data according to date of shooting is efficiently realized.

In the image capture system described above, transmission of files from the memory card 16 to the external hard disk device 3, and allocation of files transmitted to the external hard disk device 3 are realized under control of the digital camera. That is, the image capture system is constituted by the digital camera as a master, and by the hard disk device 3 as a slave. Thus, the external hard disk device 3 may be an external storage device without a transmission unit or an allocation unit.

In the image capture system described above, writing back from the external hard disk device 3 to the memory card 16, and reproduction from the external hard disk device 3 are also realized under control of the digital camera.

The structure of each part of the present invention is not limited to that shown in the preferred embodiment described above. Various modifications may be devised within the technical scope defined in claims. In the image capture system described above, files are allocated according to date of shooting. However, files may be allocated according to another index. Directory structures formed in the memory card 16 and in the external hard disk device 3, and a directory structure formed in the external hard disk device 3 as a result of data transmission and allocation, are not limited to those described above. Various alternative directory structures may be employed.

The invention claimed is:

1. An image capture device having an image shooting function, and being connectable to an external storage device, the image capture device comprising:
 a memory in which image data obtained by image shooting is stored;
 a transmission unit for transmitting several pieces of image data stored in said memory at a time to said external storage device; and
 an allocation unit for allocating said several pieces of image data transmitted to said external storage device to one or a plurality of directories according to a certain index, wherein said certain index is a date of image shooting,
 wherein said allocation unit allocates said several pieces of image data to one or a plurality of directories according to a certain index, after the said several pieces of image data have been transmitted to said external storage device.

2. The image capture device according to claim 1, wherein said transmission unit incorporates a directory structure formed in said memory as it is into a directory structure formed in said external storage device.

3. The image capture device according to claim 2, wherein said directory structure formed in said memory is incorporated into the lowermost level of said directory structure formed in said external storage device.

4. The image capture device according to claim 1, wherein said directory structure formed in said external storage device contains a data management directory for storing therein image data, and for managing the date of shooting of said image data, and
 when said date of shooting of said image data is the same as that managed by said date management directory, said allocation unit causes said image data to remain in said data management directory.

5. The image capture device according to claim 1, wherein said directory structure formed in said external storage device contains a data management directory for storing therein image data, and for managing the date of shooting of said image data, and
 when said date of shooting of said image data is different from that managed by said date management directory, said allocation unit moves said image data to a different date management directory for managing the different date of shooting.

6. The image capture device according to claim 5, further comprising a directory creation unit for creating said different date management directory, wherein
 before said image data is moved to said different date management directory for managing said different date of shooting, said allocation unit determines whether or not said different date management directory is present in said directory structure formed in said external storage device, and said directory creation unit creates said different date management directory when said allocation unit determines that said different date management directory is not present.

7. The image capture device according to claim 1, said transmission unit being configured to transmit said several pieces of image data upon receiving a start transmission signal.

8. The image capture device according to claim 1, said allocation unit being configured to allocate said several pieces of image data upon receiving an allocate by date signal.

9. The image capture device according to claim 1, further comprising a user interface element for initiating a transmission, wherein said transmission unit is configured to transmit said several pieces of image data upon activation of said user interface element.

10. The image capture device according to claim 1, wherein said transmitting of said several pieces of image data is initiated by a start transmission command.

11. The image capture device according to claim 1, wherein said allocating of said several pieces of image data is initiated by an allocate by date command.

12. The image capture device according to claim 1, wherein said transmission unit only transmits said several pieces of image data upon receiving a start transmission command.

13. An image capture device having an image shooting function, and being connectable to an external storage device, the image capture device comprising:
 a memory in which image data obtained by image shooting is stored;
 a transmission unit for transmitting several pieces of image data stored in said memory at a time to said external storage device; and
 an allocation unit for allocating said several pieces of image data transmitted to said external storage device to one or a plurality of directories according to a certain index, wherein said certain index is a date of image shooting,
 said transmission unit being configured to transmit said several pieces of image data upon receiving a start transmission signal, and said allocation unit being configured to allocate said several pieces of image data upon receiving an allocate by date signal.

14. An image capture device having an image shooting function, and being connectable to an external storage device, the image capture device comprising:
 a memory in which image data obtained by image shooting is stored;

a transmission unit for transmitting several pieces of image data stored in said memory at a time to said external storage device; and an allocation unit for allocating said several pieces of image data transmitted to said external storage device to one or a plurality of directories according to a certain index, wherein said certain index is a date of image shooting, further comprising a user interface element operable to enable or disable allocation by date, wherein said allocation unit is configured to allocate said several pieces of image data when said user interface element is operated to enable allocation by date.

15. An image capture device having an image shooting function, and being connectable to an external storage device, the image capture device comprising:

a memory in which image data obtained by image shooting is stored;

a transmission unit for transmitting several pieces of image data stored in said memory at a time to said external storage device; and an allocation unit for allocating said several pieces of image data transmitted to said external storage device to one or a plurality of directories according to a certain index, wherein said certain index is a date of image shooting, further comprising a first user interface element for initiating a transmission, and a second user interface element operable to enable or disable allocation by date, wherein said transmission unit is configured to transmit said several pieces of image data upon activation of said first user interface element, and said allocation unit is configured to allocate said several pieces of image data when said second user interface element is operated to enable allocation by date.

16. An image capture device having an image shooting function, and being connectable to an external storage device, the image capture device comprising:

a memory in which image data obtained by image shooting is stored;

a transmission unit for transmitting several pieces of image data stored in said memory at a time to said external storage device; and an allocation unit for allocating said several pieces of image data transmitted to said external storage device to one or a plurality of directories according to a certain index, wherein said certain index is a date of image shooting, wherein said transmitting of said several pieces of image data is initiated by a start transmission command, and said allocating of said several pieces of image data is initiated by an allocate by date command.

17. An image capture device having an image shooting function, and being connectable to an external storage device, the image capture device comprising:

a memory in which image data obtained by image shooting is stored;

a transmission unit for transmitting several pieces of image data stored in said memory at a time to said external storage device; and an allocation unit for allocating said several pieces of image data transmitted to said external storage device to one or a plurality of directories according to a certain index, wherein said certain index is a date of image shooting, wherein said transmission unit only transmits said several pieces of image data upon receiving a start transmission command, and said allocation unit only allocates said several pieces of image data if an allocate by date option is selected.

* * * * *